United States Patent
Vance et al.

(10) Patent No.: US 7,052,069 B2
(45) Date of Patent: May 30, 2006

(54) PROTECTIVE DEVICE FOR A VEHICLE DOOR

(76) Inventors: Phyllis Louise Vance, 1570 Riverlake Rd., Discovery Bay, CA (US) 94514; Bryon Stephen Graves, 1570 Riverlake Rd., Discovery Bay, CA (US) 94514

( * ) Notice: Subject to any disclaimer, the term of this patent is extended or adjusted under 35 U.S.C. 154(b) by 0 days.

(21) Appl. No.: 10/834,520

(22) Filed: Apr. 28, 2004

(65) Prior Publication Data

US 2005/0242608 A1 Nov. 3, 2005

(51) Int. Cl.
*B60R 13/02* (2006.01)

(52) U.S. Cl. ..................... 296/39.1; 296/152

(58) Field of Classification Search ............... 296/39.1, 296/146.7, 152, 153, 37.13, 50
See application file for complete search history.

(56) References Cited

U.S. PATENT DOCUMENTS

| | | | |
|---|---|---|---|
| 2,001,136 A * | 5/1935 | Holderbach | 160/354 |
| 4,161,335 A * | 7/1979 | Nix et al. | 296/39.2 |
| 4,588,627 A | 5/1986 | Isaksen et al. | 428/80 |
| 4,696,848 A * | 9/1987 | Jones et al. | 428/80 |
| 4,779,390 A | 10/1988 | Repper et al. | 52/222 |
| 4,873,132 A | 10/1989 | Jones et al. | 428/80 |
| 4,883,304 A * | 11/1989 | Elliott | 296/97.8 |
| 4,917,431 A * | 4/1990 | McDonald | 296/39.1 |
| 4,944,548 A * | 7/1990 | Payne et al. | 296/97.8 |
| 5,090,762 A * | 2/1992 | Krieger | 296/39.1 |
| 5,110,171 A | 5/1992 | Anthony | 296/39.2 |
| D347,417 S | 5/1994 | Hamilton | D12/221 |
| 5,803,524 A | 9/1998 | McCammon | 296/39.1 |
| 5,830,559 A * | 11/1998 | Goldbach et al. | 428/192 |
| 6,017,074 A | 1/2000 | Biskup | 296/39.1 |
| 6,036,251 A | 3/2000 | Yagishita et al. | 296/39.1 |
| 6,120,078 A | 9/2000 | Smyl | 296/39.1 |
| 6,123,385 A | 9/2000 | Bailey et al. | 296/146.7 |
| 6,595,568 B1 | 7/2003 | Schroeder et al. | 296/39.1 |
| 6,659,536 B1 | 12/2003 | Chamberlain et al. | 296/146.5 |

FOREIGN PATENT DOCUMENTS

| | | | | |
|---|---|---|---|---|
| FR | 2409669 | * | 7/1979 | 296/39.1 |
| JP | 406270677 | * | 9/1994 | 296/146.7 |

OTHER PUBLICATIONS

Sporto Motoring Accessories, http://www.sportomotoring.com, Sep. 27, 2003.
Zordoff-Car Door Protectors, http://zordoff.com, Mar. 30, 2004.

* cited by examiner

*Primary Examiner*—Dennis H. Pedder
(74) *Attorney, Agent, or Firm*—Zilka-Kotab, PC

(57) ABSTRACT

An automotive door protector according to one embodiment includes a curtain mountable to a door, the curtain being substantially coextensive with an outer periphery of an adjacent inner side of the door. An engaging mechanism attached to the curtain couples the curtain to the door.

30 Claims, 8 Drawing Sheets

PROTECTIVE DEVICE FOR A VEHICLE DOOR

FIELD OF THE INVENTION

The present invention relates to automotive accessories and more particularly, this invention relates to a protective device for a door of an automobile.

BACKGROUND OF THE INVENTION

Vehicle owners use their cars and trucks for a variety of purposes. One common use of vehicle cargo areas and back seats is to store and transport a variety of items. Many vehicles also have retractable seats which can be retracted to create a larger cargo area. However, some items, particularly larger items, can shift in a cargo area or back seat during braking and turning and scratch, scuff, or even crack the vehicle's interior door panels. Items also tend to vibrate due to the inherent vibration that a vehicle encounters from variations in the road surface. If the item is resting against the vehicle door, the repeated movement of the item due to vibration could cause the item to scuff the door. In addition, items stacked on other items tend to slide off the underlying items and strike the doors, often scratching, scuffing, or cracking the door.

Not only do such scratches, scuffs and cracks detract from the vehicle's appearance, but they also reduce the resale or trade-in value of the vehicle. The problem is particularly problematic among individuals who lease their vehicles, as the leaseholder may incur damage penalties or charges when returning a vehicle at the end of a lease. Such charges could potentially amount to hundreds or even thousands of dollars depending on the amount of damage.

Another common source of damage to door panels is due to pets. Pets, especially dogs, are known to place their paws on the window jamb, and consequently scratch the interior door panels and window jambs with their claws. Such scratches detract from the vehicle's appearance and reduce the resale or trade-in value of the vehicle.

Children also pose a threat to vehicle doors. It is not uncommon for children to spill liquids and foods on a passenger door. While such spills can often be wiped up, spills that enter speaker grilles, door handles, window buttons, door locks, etc. may be impossible to clean up without disassembly of the door. Further, spills entering such areas can cause costly damage such as electrical shorts, malfunction, etc. Another issue relating to children is safety, as discussed in more detail below.

Therefore, a need exists for an automotive door protector for protecting a door of a vehicle from damage caused by cargo, pets, spills, etc., thus ensuring that the door will not be scratched, scuffed, marked, soiled, or otherwise damaged. This in turn preserves the appearance of the vehicle and spares the owner the cost of having the door panel repaired or replaced. By protecting a vehicle's interior, the vehicle's appearance would be maintained, as well as its trade in or resale value.

Figure 1:
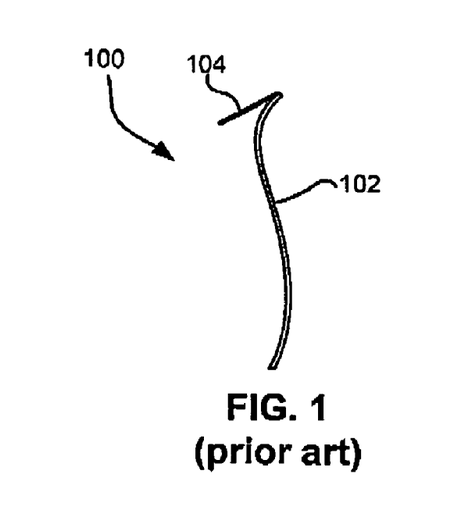
FIG. 1 is a side view of a door protective device.
Figure 2:
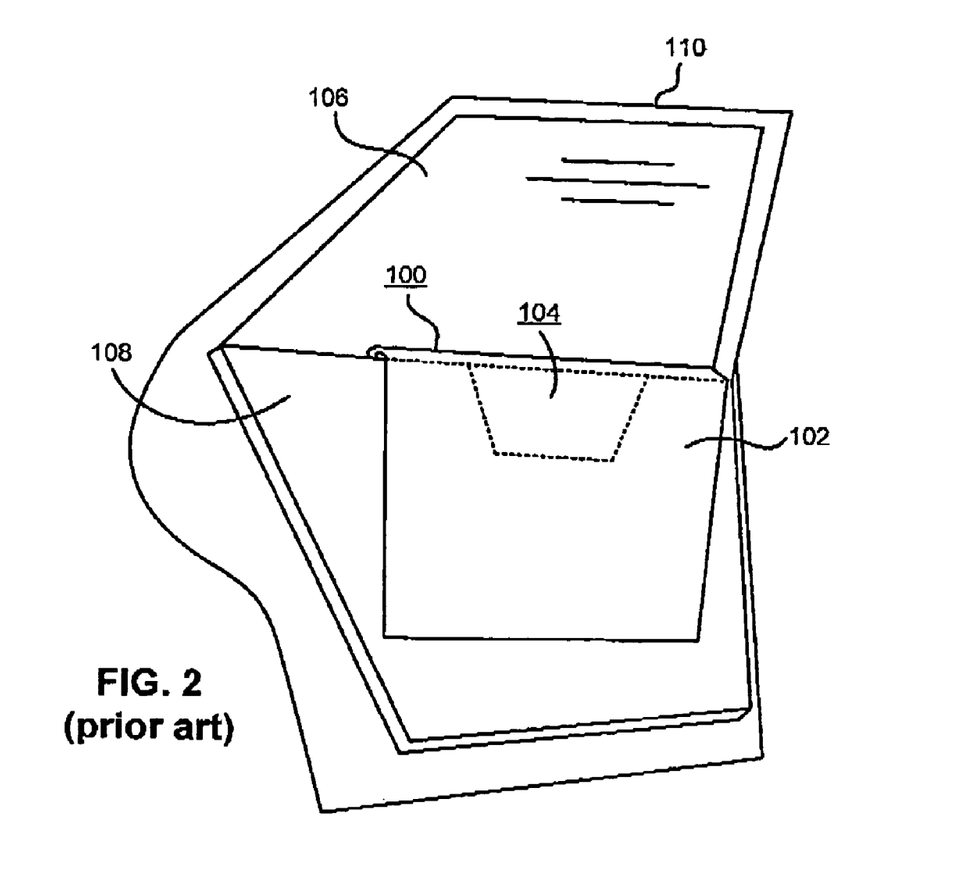
FIG. 2 is a front view of the door protective device of FIG. 1 in use.

One known attempt at vehicle door protection is sold by Zordoff (www.zordoff.com). The device is shown in FIGS. 1 and 2. As shown, the device 100 is basically a sheet 102 of fabric having a flap 104 coupled to one end thereof. The flap 104 is slipped between the window 106 and inner door panel 108 of a vehicle door 110. However, this product has several disadvantages. First, as shown in FIG. 2, because the shape of the sheet 102 is rectangular, substantial portions of the door panel 108 remain unprotected. Second, because the sheet 102 is not coextensive with the door 110, sliding objects will tend to catch and curl the edges of the sheet 102, thereby rendering the device 100 inoperative.

A safety issue that has heretofore required complex mechanical means to implement is that relating to children playing with the door's lock and window controls, as well as the door's handle. Likewise, it is not uncommon for pets to accidentally activate power windows or door locks. The tragedy that could befall a child or pet falling from an open door during travel at highway speeds is self evident. Further, it is not uncommon for a child to close his or her extremities in a closing window.

To counter the potential for tragedy, automobile manufacturers are now installing child safety locks and window disabling mechanisms, also known as window locks, on many new vehicles. However, mechanisms such as child safety locks that disengage operation of the door handle require actuation of a mechanism on the jamb of the door. Because of the difficulty of engaging such mechanisms, many drivers simply forego engaging them. Other drivers do not want to deal with the inconvenience of constantly engaging and disengaging such mechanisms. Similarly, while window locks are often engaged by merely pushing a button, parents often forget to engage the window lock or may accidentally and unknowingly disengage the window lock.

What is also needed is a device that enhances safety by reducing the risk of children or pets being injured by power windows or possibly falling from the vehicle.

SUMMARY OF THE INVENTION

The automotive door protector of the present invention is a protective accessory for the interiors of motor vehicles. It is used to effectively shield the interior panel of a vehicle's door from damage caused by cargo, pets, spills, etc., thus reducing the likelihood that the panel will not be scratched, scuffed, marked, soiled, or otherwise damaged. Thus, the automotive door protector preserves the appearance of the vehicle and spares the owner the cost of having the door panel repaired or replaced. The automotive door protector of the present invention also enhances safety by reducing the risk of children or pets being injured by power windows or possibly falling from the vehicle.

An automotive door protector according to one embodiment includes a curtain mountable to a door, the curtain being substantially coextensive with an outer periphery of an adjacent inner side of the door. An engaging mechanism attached to the curtain couples the curtain to the door.

The curtain can have many configurations, including being flexible, being substantially rigid, having a topography generally corresponding to a topography of a portion of the door adjacent to the curtain, and formed of a series of panels. In the latter case, the panels are preferably hingedly coupled together and foldable in an accordion-like manner for compact storage.

The curtain can have cutouts for providing access to controls of the door. A substantially non-abrasive backing can be coupled to the curtain to further protect the door. In addition, supplemental coupling devices can be provided for providing additional coupling of the curtain to the door.

The engaging mechanism can detachably attach to a window gap or window jamb of the door. The engaging mechanism can also detachably attach to a window of the door. In one embodiment, the engaging mechanism is offset from an upper end of the curtain. In another embodiment, the curtain covers at least a portion of a window of the door.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

The automotive door protector of the present invention is a protective accessory for the interiors of motor vehicles. It is used to effectively shield the interior panel of a vehicle's door from damage caused by cargo, pets, spills, etc., thus reducing the likelihood that the panel will be scratched, scuffed, marked, soiled, or otherwise damaged. Thus, the automotive door protector preserves the appearance of the vehicle and spares the owner the cost of having the door panel repaired or replaced. The automotive door protector of the present invention also enhances safety by reducing the risk of children or pets being injured by power windows or possibly falling from the vehicle.

Figure 3A:
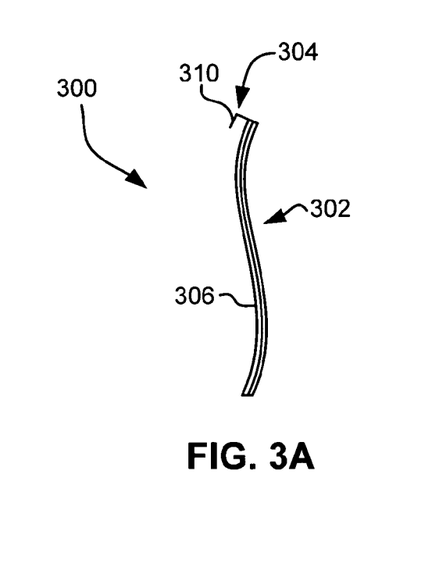
FIG. 3A is a side view of an automotive door protector of the present invention.
Figure 3B:
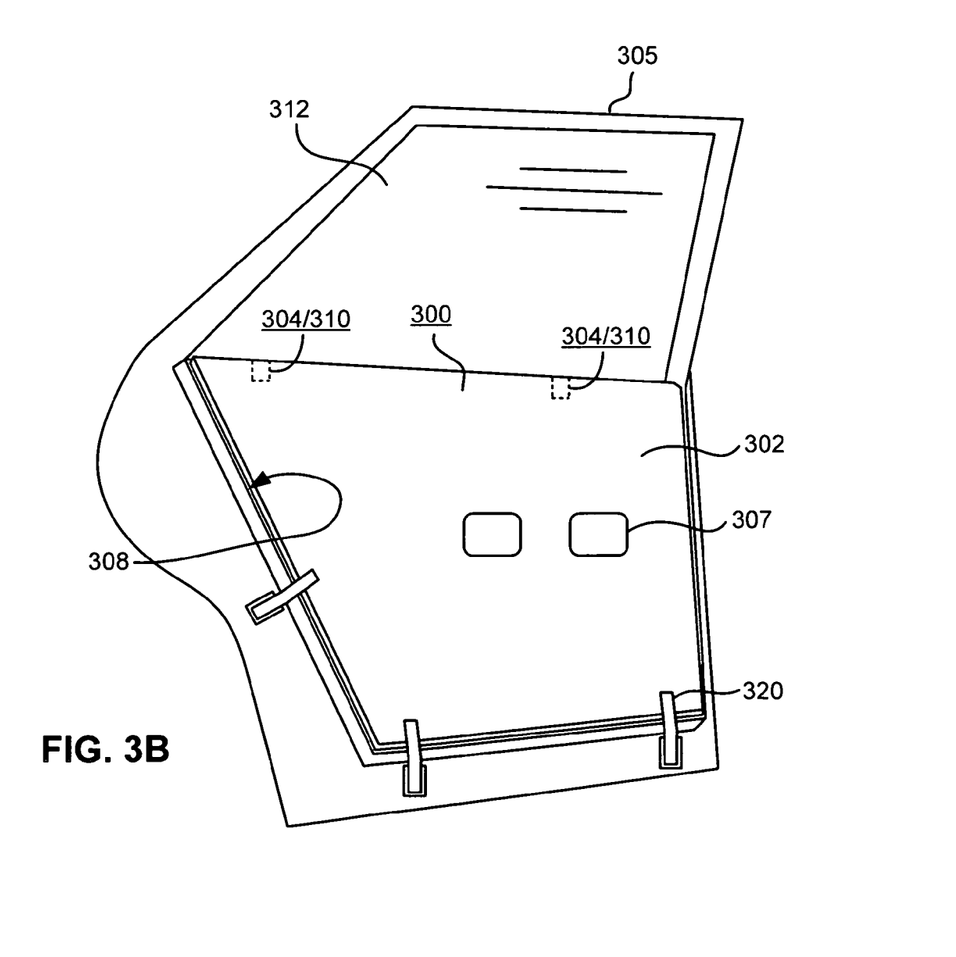
FIG. 3B is a perspective view of the automotive door protector of FIG. 3A in the deployed position.

FIGS. 3A and 3B illustrate one embodiment of the automotive door protector 300 of the present invention. As shown, the automotive door protector 300 includes a curtain 302 and an engaging mechanism 304 for coupling the automotive door protector 300 to a door 305. The shape of the curtain 302 is substantially coextensive with the outer periphery of the adjacent portion of the door 305 (such as the inner panel 308 of the door 305) in order to provide maximum protection to the door 305.

The curtain 302 can be constructed of a durable yet flexible material such as fabric, denim, vinyl, etc. Alternatively, the curtain can be substantially rigid for maximum protection. The curtain 302 can also be formed with a topography generally corresponding to the contour of the door 305, thereby maximizing the space available for cargo and passengers in the vehicle interior. A curtain combining the benefits of resilience with foldability is described in more detail below in the discussion of FIGS. 8 and 9.

Cutouts 307 can be formed in the curtain 302 to allow access to door controls (e.g., handles, window actuators or buttons, lock actuators or buttons, etc.). In such embodiments, the automotive door protector 300 would provide protection to the door 305 while still allowing the door 305 to remain functional.

The curtain 302 preferably has a non-abrasive backing 306 that reduces any damage to the underlying door panel, even under pressure exerted by an object lying thereagainst. One example of such non-abrasive backing 306 is felt or a felt-like material.

The engaging mechanism 304 can be formed of one or more J-shaped hooks 310 that are insertable in the gap between the window 312 and the window seal of the door 305. Alternatively, the hooks 310 can be shorter such that the hooks 310 merely hang on the window jamb of the door 305 without requiring insertion in the window gap. In one embodiment, the engaging mechanism 304 can include a series of hooks 310 spaced in an equidistant manner across the length of the curtain 302. A preferred embodiment includes at least two hooks 310 to prevent pivoting of the automotive door protector 300, but can have as few as one or as many as desired.

Figure 4A:
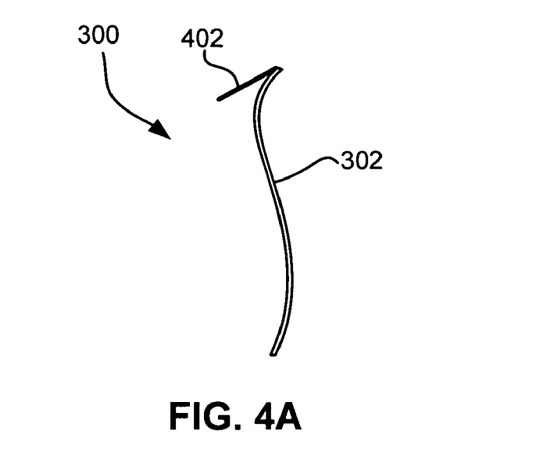
FIG. 4A is a side view of another automotive door protector of the present invention.
Figure 4B:
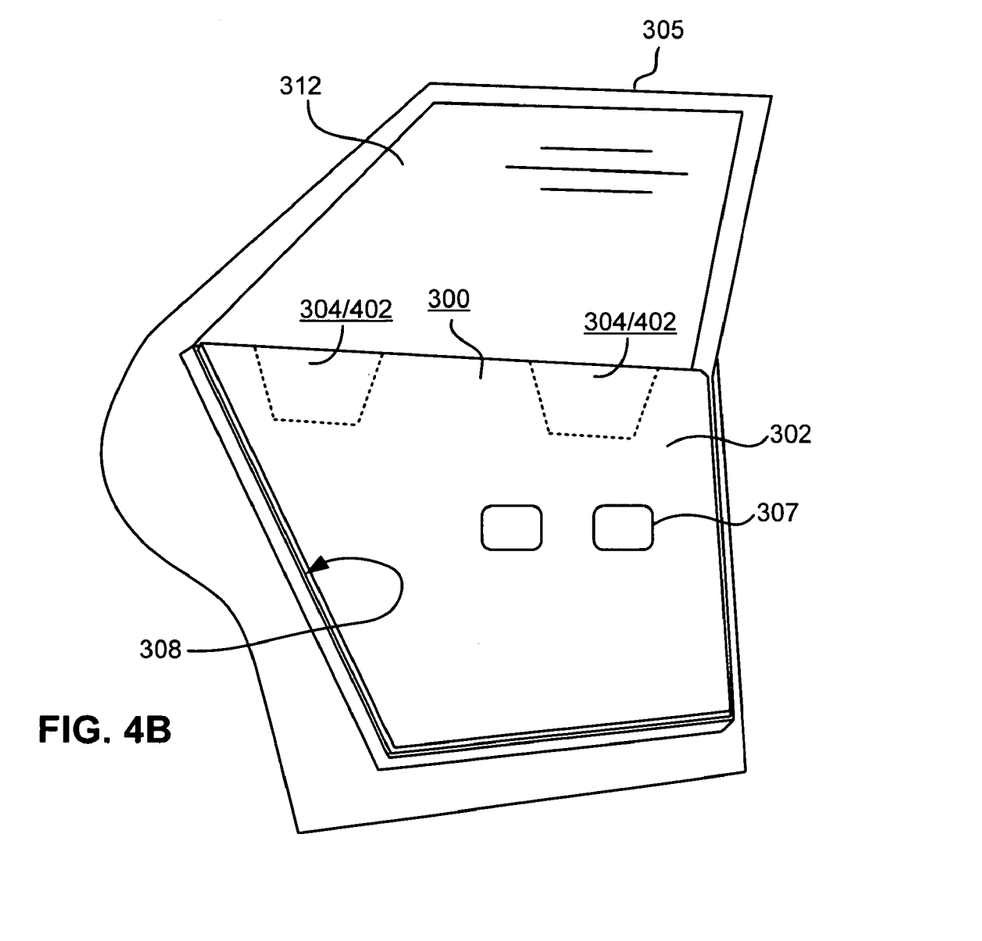
FIG. 4B is a perspective view of the automotive door protector of FIG. 4A in the deployed position.

An alternate embodiment of the engaging mechanism 304 is shown in FIGS. 4A–B. The engaging mechanism 304 in this embodiment has one or more substantially planar resilient or resiliently deformable members 402.

With continued reference to FIGS. 3A–B, optional supplemental coupling devices 320 can be added to the automotive door protector 300 to provide supplemental coupling of the curtain 302 to the door 305. The supplemental coupling devices 320 are preferably attached to the periphery of the curtain 302 to aid in alignment of the curtain 302 to the periphery of the door 305 as well as to prevent curling of the edges of the curtain 302 as could occur when an objects slides against the edge of the curtain 302. One example of a suitable supplemental coupling device 320 is a hooks and loops fastener where a hooks or loops portion is coupled to the curtain 302 and the complementary portion of the hooks and loops fastener is attached to the door 305. Another suitable supplemental coupling device 320 is a snap, which can be attached to the curtain 302 and door 305 in a similar manner as the hooks and loops fastener. Yet another type of supplemental coupling device 320 is a member or strap that becomes pinched between the door 305 and the vehicle chassis when the door is closed thereon. The supplemental coupling devices 320 are preferably attached to a central and/or lower region of the automotive door protector 300.

Figure 5A:
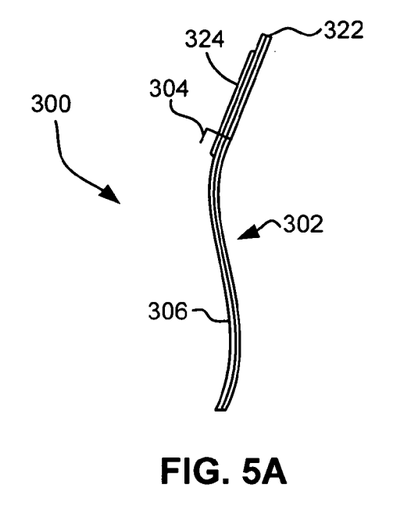
FIG. 5A is a side view of yet another automotive door protector of the present invention where the engaging mechanism is offset from the upper end of the automotive door protector.
Figure 5B:
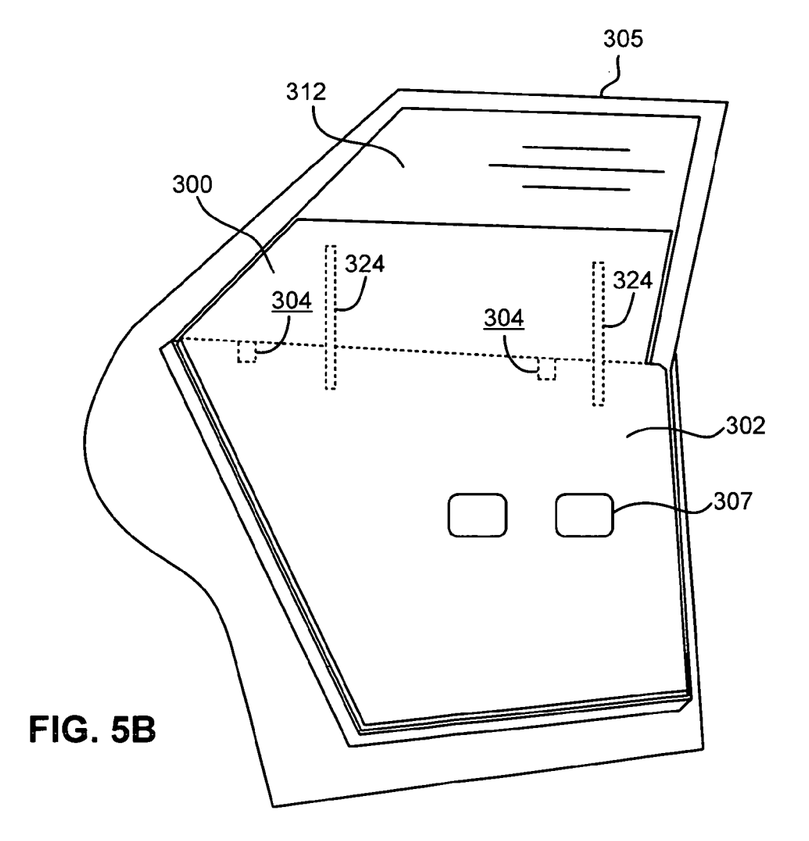
FIG. 5B is a perspective view of the automotive door protector of FIG. 5A in the deployed position.

As shown in FIGS. 5A–B, the engaging mechanism 304 can be offset from the upper end of the curtain 302. This allows the upper end of the curtain 302 to overlap and potentially engage a portion of the window 312, thereby providing enhanced protection to the window jamb as well as reducing the likelihood of a spill from entering the window gap. Optionally, the upper portion of the curtain 302 can extend to cover some or all of the window to protect the window 312. The upper portion of the curtain 302 can be resilient or have a support member 324 that holds the upper portion of the curtain 302 adjacent the window 312.

Figure 6A:
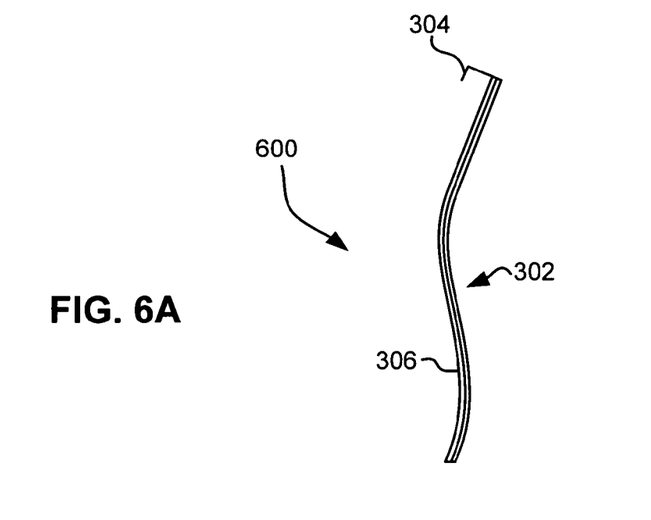
FIG. 6A is a side view of yet another automotive door protector of the present invention where the engaging mechanism attaches to the top of the window and optionally the window gap or jamb.
Figure 6B:
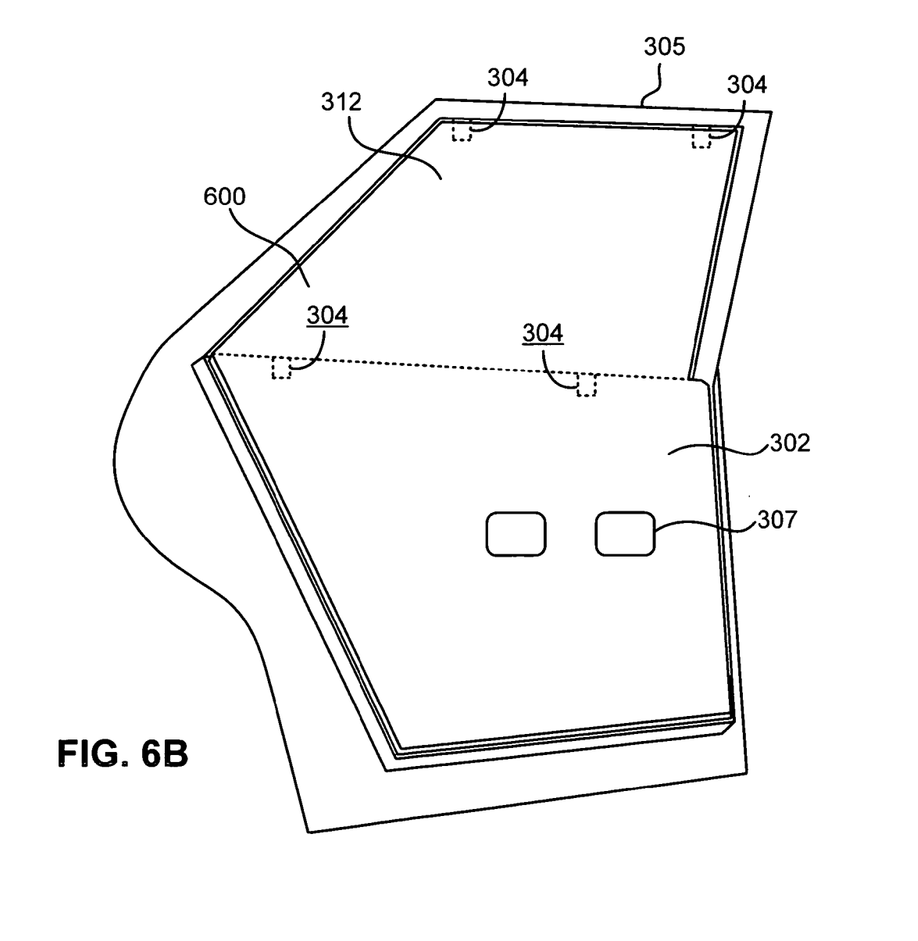
FIG. 6B is a perspective view of the automotive door protector of FIG. 6A in the deployed position.

FIGS. 6A–B illustrate yet another embodiment of an automotive door protector 600, where the engaging mechanism 304 (e.g., hooks) attaches to the top of the window 312 (and optionally the window gap or jamb) for protecting both the door panel and the window. As shown, the automotive door protector 600 is preferably substantially coextensive with the periphery of the inner side of the door 305.

An additional benefit provided by the embodiments shown in FIGS. 5A–6B is that the portion of the curtain 302 that overlaps the window 312 provides partial and even full shade to passengers and cargo in the vehicle.

Figure 7:
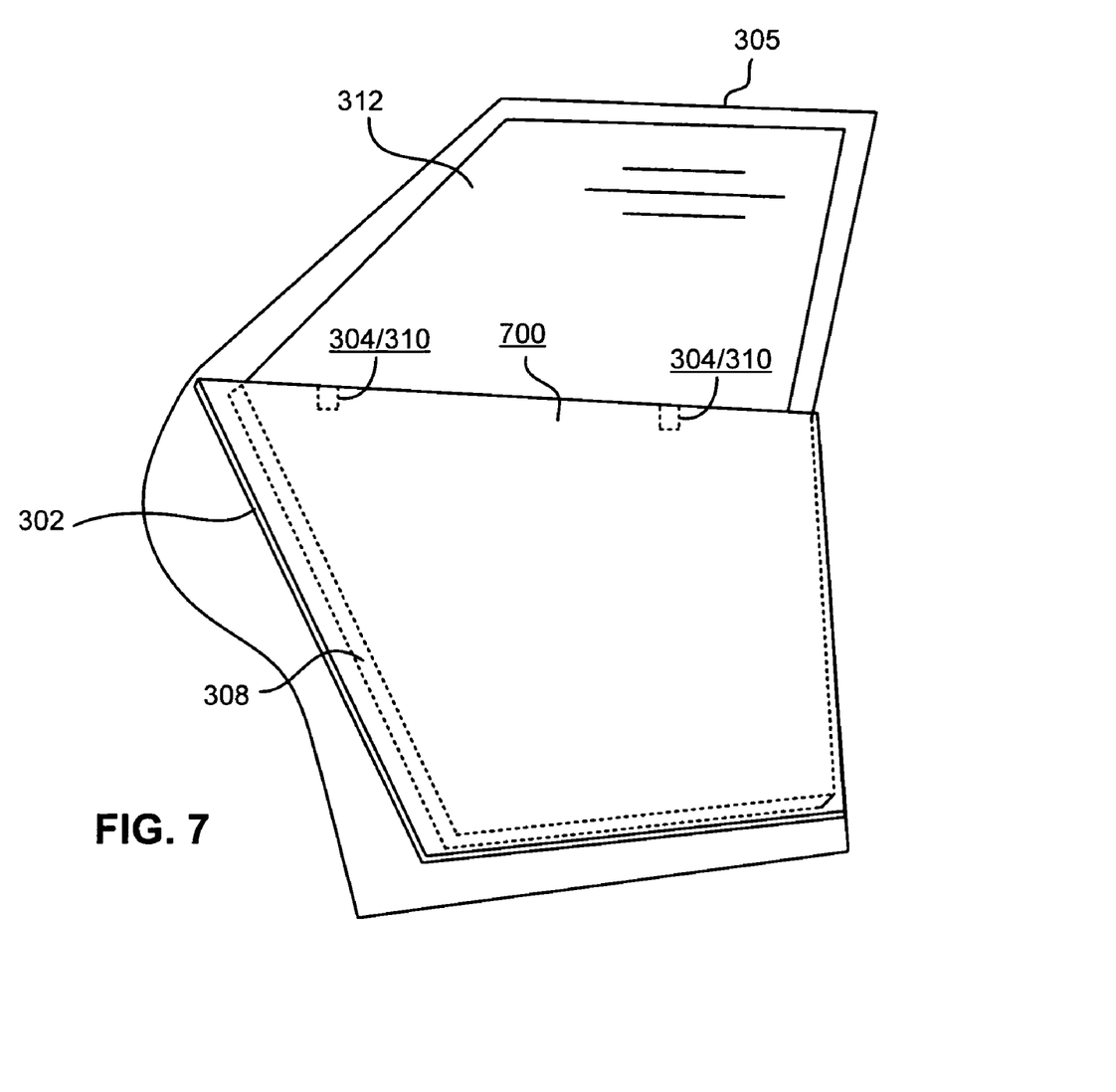
FIG. 7 illustrates another embodiment of an automotive door protector, where the automotive door protector extends beyond the inner panel of the door.

FIG. 7 illustrates another embodiment of an automotive door protector 700, where the automotive door protector 700 extends beyond the inner panel 308 of the door 305. This embodiment provides a protective overlap for the edges of the door 305.

Figure 8:
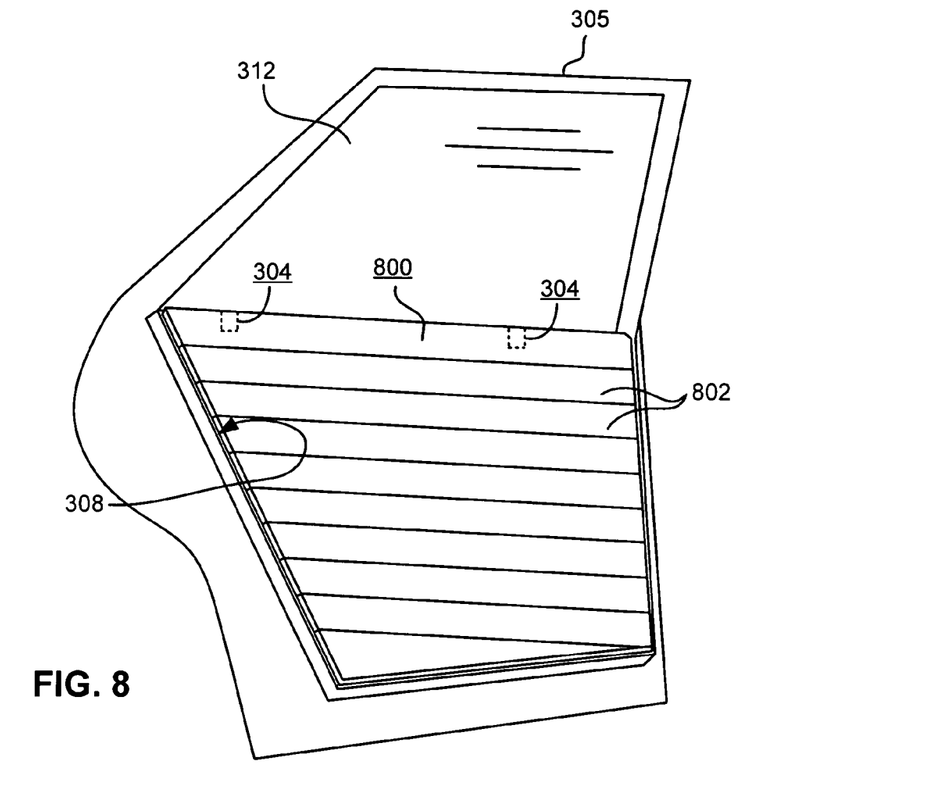
FIG. 8 depicts yet another embodiment of an automotive door protector having an assembly of several flat, elongate panels connected to one another.
Figure 10:
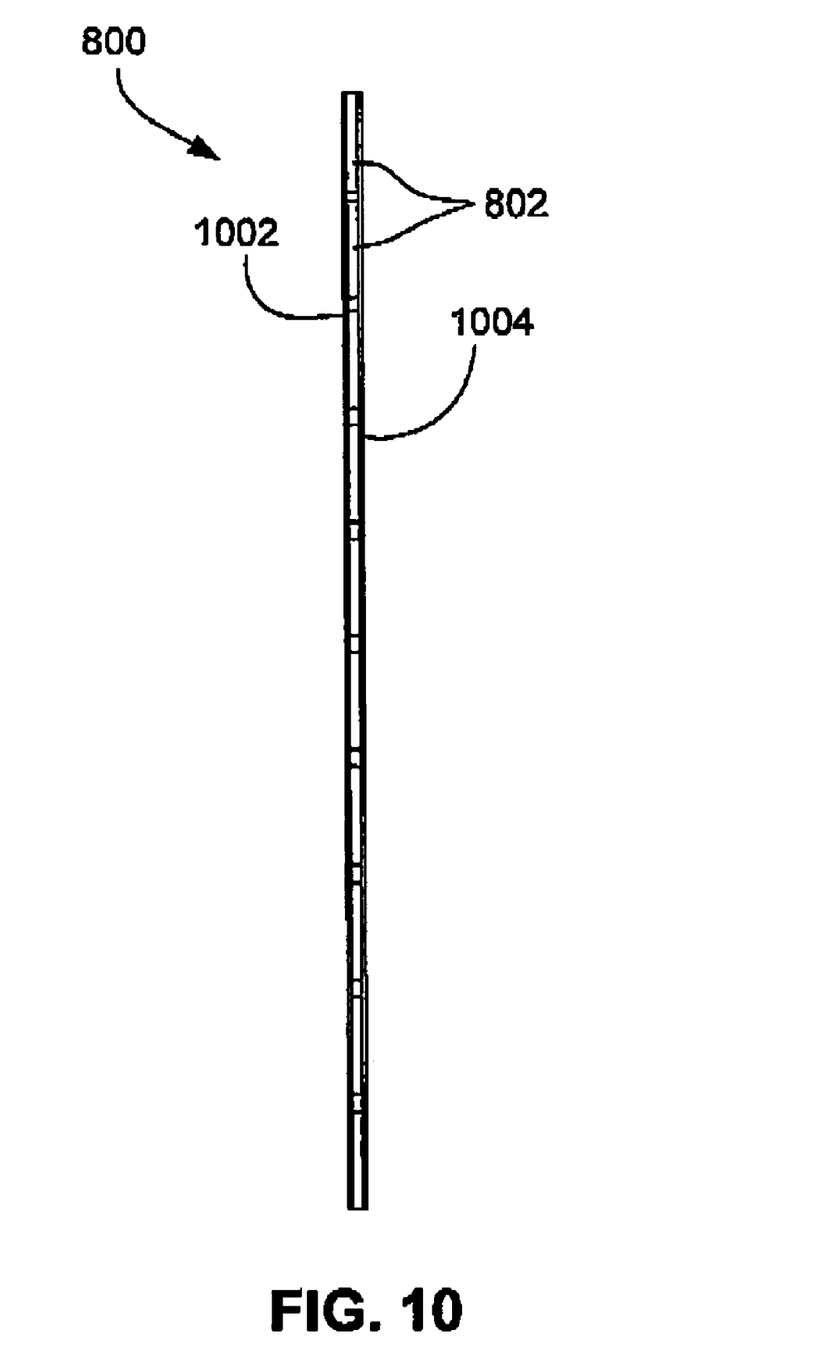
FIG. 10 is a side cross-sectional view of the automotive door protector of FIG. 8.

FIG. 8 depicts yet another embodiment of an automotive door protector 800. The automotive door protector 800 in this embodiment includes an assembly of several flat, elongate panels 802 hingedly connected to one another via any suitable coupling mechanism. The panels 802 themselves are preferably formed of a rigid or resiliently deformable material such as metal or plastic (e.g., polyethylene or nylon). The panels 802 may also be formed of other materials such as cardboard, leather, vinyl, fabric, etc. As shown in FIG. 10. an outer layer of material 1002, e.g., vinyl, fabric, leather, etc., can be added to the automotive door protector 800, and can provide the coupling mechanism for holding the panels 802 together. The panels 802 may also be hingedly coupled together by two layers of material 1002, 1004 positioned on opposite sides of the panels, as shown in FIG. 10. Another type of coupling mechanism shown would be one or more vertically oriented straps of a suitable material, e.g., vinyl or nylon. However, one skilled in the art will appreciate that many types of coupling mechanisms may be employed.

Figure 9:
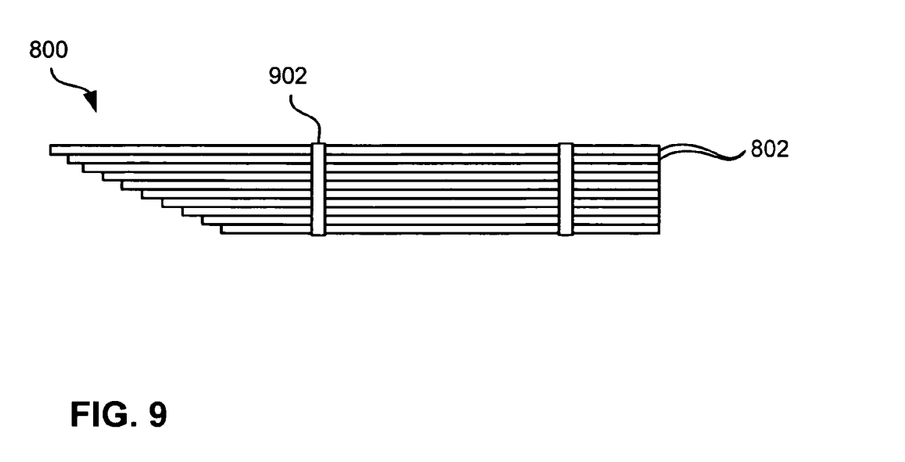
FIG. 9 is a side view of the automotive door protector of FIG. 8 in a compacted (stowing) position.

As shown in FIG. 9, the hinged coupling allows the panels 802 to be folded one atop the other in an accordion-like manner for compact storage. Straps 902 can be provided to wrap around the automotive door protector 800 to hold it in the compacted configuration.

In one illustrative embodiment provided by way of example only, the automotive door protector includes a series of about five to thirty, preferably about ten, thin plastic panels that are sandwiched between, and thereby connected to one another by, two flexible vinyl or nylon outer layers, the panels being positioned one atop the other in a horizontal manner. The assembly of panels measures between about 24 and 48 inches tall, between about 12 and 36 inches wide, and between about 1/16 to 3/4 inch thick when unfolded, while the short edges of the individual panels are cut to accommodate the shape of a vehicle's interior door panel (or entire door).

One skilled in the art will appreciate that the automotive door protectors described herein can be adapted for attachment to a rear door of any type of vehicle including but not limited to a passenger car, mini-van, sport utility vehicle (SUV), vehicles with fold-down seats, etc.

Note that the various components of the embodiments described above can be implemented in any of the embodiments described. For instance, a non-abrasive backing can be added to any of the above embodiments to prevent the panels or curtain from scratching the interior panel of a vehicle's door.

The automotive door protectors described above can be produced in a variety of custom sizes and shapes to fit over the doors of various vehicles and offered in various colors to match or enhance the look of a vehicle's interior. The automotive door protectors could also be imprinted with a wide variety of decorative designs, including but not limited to vehicle names and trademarks, children's cartoon characters, sports team logos, etc. One embodiment has a netlike or disordered pattern designed such that scratches to the automotive door protector blend into the pattern and are less noticeable.

The automotive door protector could be produced from highly durable materials for use with commercial vehicles.

A carry bag, e.g., of nylon or canvas, can be used with the automotive door protector for convenient, space-saving storage.

The automotive door protector can be packaged in a cardboard pressboard box, sized to the product, coated with clear polyvinylchloride using the calendering process. The box can be imprinted in one or more colors (including four-color process) with product name, manufacturer, and instructions for installation. Corrugated cardboard shipping containers can then be used to hold a quantity of individually packaged products to facilitate shipment and storage.

To use the automotive door protector, a user would simply secure the engaging mechanism as described above, and unfold or unwrap the unit so that it is draped over the interior of the door. The automotive door protector effectively covers the door panel (and window in some embodiments), and preferably the door lock and window controls, thereby protecting the door from damage that might be caused by shifting cargo, pets, etc.

Designed in this manner, the automotive door protector provides a protective barrier between any cargo that a motorist may be hauling and the vehicle's interior door panels. It can be used in passenger cars, mini-vans, trucks, and sport utility vehicles (SUVs), as a wide variety of items can be transported in the back seats of such vehicles or when the seats are folded forward.

By protecting a vehicle's interior, the automotive door protector would help maintain the vehicle's appearance, as well as its trade in or resale value. It would also be particularly useful among individuals who lease their vehicles, as it would help the leaseholder avoid damage penalties or charges when returning a vehicle at the end of a lease. Such charges could potentially amount to hundreds or even thousands of dollars depending on the amount of damage.

The automotive door protector not only protects a door panel from damage caused by cargo, but it also prevents pets, particularly dogs, from scratching interior door panels with their paws. Again, this would preserve the appearance of the vehicle and spare the owner the costs of having interior components repaired or replaced. The unit also prevents children from playing with the door lock and window controls, as well as the door handle. This enhances safety, as the risk of children or pets being injured by power windows or possibly falling from the vehicle would be virtually eliminated.

In addition, the automotive door protector is easy to install and remove and can folded flat or be rolled up for convenient storage within its own carry bag. The unit so folded or wrapped requires little space within a cargo area or back seat and could thus be kept within a vehicle at all times for convenient access. Thus, the automotive door protector is easy to use, convenient, practical, effectively designed, protective, cost-effective, time- and effort-saving, potentially safety-enhancing, and durable for years of low maintenance-use.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An automotive door protector, comprising:
    a curtain mountable to a door, the curtain being substantially coextensive with at least a portion of an outer periphery of an adjacent inner side of the door in an interior of an automobile, the curtain being formed of a series of between about 5 and about 10 resiliently deformable panels hingedly coupled together such that the panels are foldable one atop the other in an accordion-like manner for storage; and
    an engaging mechanism attached to the curtain for coupling the curtain to the door.

2. The automotive door protector as recited in claim 1, wherein the panels are hingedly coupled together by an outer layer of material being substantially coextensive with the outer periphery of the curtain.

3. The automotive door protector as recited in claim 1, wherein the panels are hingedly coupled together by two layers of material positioned on opposite sides of the panels.

4. The automotive door protector as recited in claim 1, further comprising a substantially non-abrasive backing coupled to the curtain and facing the automotive door, wherein the curtain includes cutouts for providing access to controls of the door, wherein the engaging mechanism detachably attaches to a window gap of the door.

5. The automotive door protector as recited in claim 1, wherein the curtain is formed of about 10 panels.

6. The automotive door protector as recited in claim 5, wherein the panels are hingedly coupled together by an outer layer of material being substantially coextensive with the outer periphery of the curtain.

7. The automotive door protector as recited in claim 1 further comprising straps coupled to the curtain for selectively maintaining the curtain in a folded configuration.

8. The automotive door protector as recited in claim 1, wherein the curtain includes cutouts for providing access to controls of the door.

9. The automotive door protector as recited in claim 1, further comprising a substantially non-abrasive backing coupled to the curtain.

10. The automotive door protector as recited in claim 1, further comprising supplemental coupling devices for coupling at least one of a central and a lower region of the curtain to the door.

11. The automotive door protector as recited in claim 1, wherein the engaging mechanism detachably attaches to a window gap of the door.

12. The automotive door protector as recited in claim 1, wherein the engaging mechanism detachably attaches to a window jamb of the door.

13. The automotive door protector as recited in claim 1, wherein the door has a window, wherein the engaging mechanism detachably attaches to the window of the door.

14. The automotive door protector as recited in claim 1, wherein the engaging mechanism is offset from an upper end of the curtain.

15. The automotive door protector as recited in claim 1, wherein the curtain covers at least a portion of a window of the door.

16. An automotive door protector kit comprising:
    a curtain mountable to a door of a vehicle the curtain having an outer periphery that is substantially coextensive with a portion of an outer periphery of an adjacent inner side of a non-window portion of the door proximate to the curtain, the curtain being formed of a series of resiliently deformable panels hingedly coupled together such that the panels are readily foldable one atop the other in an accordion-like manner for storage;
    a substantially non-abrasive backing coupled to the curtain;
    an engaging mechanism attached to the curtain for coupling the curtain to the door;
    supplemental coupling devices for coupling at least one of a central and a lower region of the curtain to the door;
    a substantially non-abrasive backing coupled to the curtain,
    straps coupled to the curtain for selectively maintaining the curtain in a folded configuration;
    wherein the curtain includes cutouts for providing access to controls of the door,
    wherein the engaging mechanism detachably attaches to a window gap of the door,
    wherein the curtain has between about 5 and about 10 panels,
    wherein the panels are hingedly coupled together by two layers of material positioned on opposite sides of the panels, at least one of the layers of material being coextensive with the outer periphery of the curtain.

17. An automotive door protector, comprising:
    a curtain mountable to a door of a vehicle, the curtain being formed of a series of resiliently deformable panels hingedly coupled together such that the panels are foldable one atop the other in an accordion-like manner for storage, the curtain being substantially coextensive with at least an outer periphery of an adjacent inner side of a non-window portion of the door; and
    an engaging mechanism attached to the curtain for coupling the curtain to the door.

18. The automotive door protector as recited in claim 17, wherein the panels are hingedly coupled together by an outer layer of material being substantially coextensive with the outer periphery of the curtain.

19. The automotive door protector as recited in claim 18, further comprising straps coupled to the curtain for selectively maintaining the curtain in a folded configuration.

20. The automotive door protector as recited in claim 18, wherein the panels are hingedly coupled together by two layers of material positioned on opposite sides of the panels.

21. The automotive door protector as recited in claim 17, further comprising a substantially non-abrasive backing coupled to the curtain and facing the automotive door, the backing being selected from a group consisting of felt and felt-like materials, wherein the panels are substantially rigid, wherein the curtain includes cutouts for providing access to controls of the door, wherein the engaging mechanism detachably attaches to a window gap of the door, wherein the curtain has between about 5 and about 10 panels.

22. The automotive door protector as recited in claim 17, wherein the curtain has a topography generally corresponding to a topography of a portion of the door adjacent to the curtain.

23. The automotive door protector as recited in claim 17, wherein the curtain includes cutouts for providing access to controls of the door.

24. The automotive door protector as recited in claim 17, further comprising a substantially non-abrasive backing coupled to the curtain.

25. The automotive door protector as recited in claim 17, further comprising supplemental coupling devices for coupling at least one of a central and a lower region of the curtain to the door.

26. The automotive door protector as recited in claim 17, wherein the engaging mechanism detachably attaches to a window gap of the door.

27. The automotive door protector as recited in claim 17, wherein the engaging mechanism detachably attaches to a window jamb of the door.

28. The automotive door protector as recited in claim 17, wherein the door has a window, wherein the engaging mechanism detachably attaches to the window of the door.

29. The automotive door protector as recited in claim 17, wherein the engaging mechanism is offset from an upper end of the curtain.

30. The automotive door protector as recited in claim 17, wherein the curtain covers at least a portion of a window of the door.

* * * * *